US011994287B2

(12) United States Patent
Jell et al.

(10) Patent No.: US 11,994,287 B2
(45) Date of Patent: May 28, 2024

(54) METHOD FOR OPERATING A FURNACE UNIT

(71) Applicant: MARTIN GmbH fuer Umwelt—und Energietechnik, Munich (DE)

(72) Inventors: Sebastian Josef Jell, Munich (DE); Max Josef Schoensteiner, Munich (DE); Ulrich Martin, Munich (DE)

(73) Assignee: MARTIN GmbH fuer Umwelt- und Energietechnik, Munich (DE)

( * ) Notice: Subject to any disclaimer, the term of this patent is extended or adjusted under 35 U.S.C. 154(b) by 423 days.

(21) Appl. No.: 17/173,402

(22) Filed: Feb. 11, 2021

(65) Prior Publication Data

US 2021/0254828 A1 Aug. 19, 2021

(30) Foreign Application Priority Data

Feb. 14, 2020 (DE) .................... 10 2020 000 980.8

(51) Int. Cl.
*F23G 5/50* (2006.01)
*F23G 5/44* (2006.01)
*F23G 5/46* (2006.01)
F23G 5/00 (2006.01)
G05B 13/02 (2006.01)

(52) U.S. Cl.
CPC ............ *F23G 5/50* (2013.01); *F23G 5/442* (2013.01); *F23G 5/46* (2013.01); *F23G 5/002* (2013.01); *F23G 2205/16* (2013.01); *F23G 2207/20* (2013.01); *G05B 13/027* (2013.01)

(58) Field of Classification Search
CPC .......... F23N 5/082; F23N 2229/20; F23N 2900/05006; F23N 2223/48; F23G 5/46; F23G 5/50; F23G 5/442; F23G 2207/20; F23G 2205/16; F23G 2900/55007; F23G 5/002; F23G 2207/112; G05B 13/027
See application file for complete search history.

(56) References Cited

U.S. PATENT DOCUMENTS

| | | | | |
|---|---|---|---|---|
| 5,606,924 A | * | 3/1997 | Martin | F23N 5/082 110/101 CD |
| 5,890,444 A | | 4/1999 | Martin et al. | |
| 8,219,247 B2 | * | 7/2012 | Esmaili | F23N 5/082 422/204 |
| 10,746,470 B2 | * | 8/2020 | Esmaili | F27D 21/0014 |
| 10,878,943 B2 | * | 12/2020 | Yuhas | B01J 35/002 |

(Continued)

FOREIGN PATENT DOCUMENTS

| | | |
|---|---|---|
| CN | 108 709 187 A | 10/2018 |
| DE | 42 20 149 A1 | 12/1993 |

(Continued)

OTHER PUBLICATIONS

German Search Report dated Nov. 3, 2020 in German Application No. 10 2020 000 980.8 with English translation of the relevant parts.

*Primary Examiner* — Shogo Sasaki
(74) *Attorney, Agent, or Firm* — Collard & Roe, P.C.

(57) ABSTRACT

A method operates a furnace unit with a feed chute and a camera for capturing an image of the surface of the chute. The chute includes a slide on which material flows to a grate, and the coverage of the chute and in particular of the slide with material, the burning bed thickness and the burnout zone are determined by an image evaluation.

26 Claims, 3 Drawing Sheets

(56) References Cited

U.S. PATENT DOCUMENTS 11,365,886 B2 *  6/2022  Faiella .................... F23D 91/04
2009/0293787 A1  12/2009  Martin et al.

FOREIGN PATENT DOCUMENTS

| DE | 197 35 139 C1 | 2/1999 |
| JP | H01-277118 A | 11/1989 |
| JP | 2017-009194 A | 1/2017 |

* cited by examiner

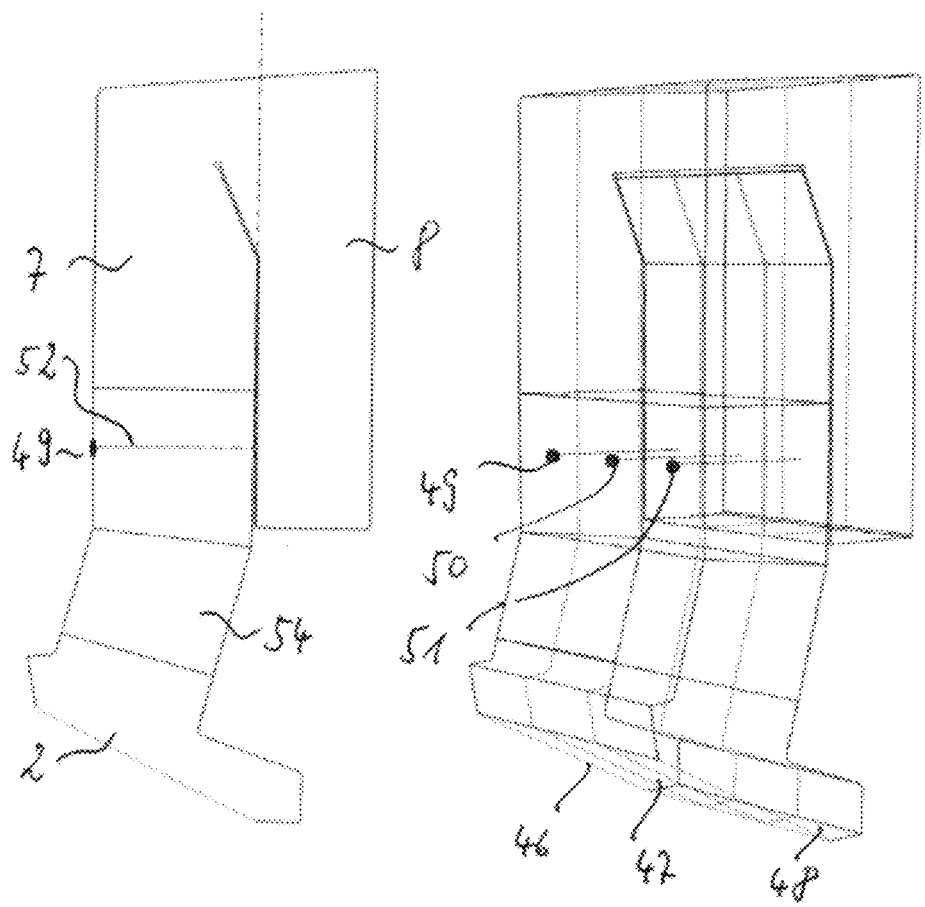

METHOD FOR OPERATING A FURNACE UNIT

CROSS REFERENCE TO RELATED APPLICATIONS

Applicant claims priority under 35 U.S.C. § 119 of German Application No. 10 2020 000 980.8 filed Feb. 14, 2020, the disclosure of which is incorporated by reference.

BACKGROUND OF THE INVENTION

1. Field of the Invention

The invention relates to a method for operating a furnace unit.

2. Description of the Related Art

It is important when operating a furnace unit that a defined amount of material per unit of time passes through the furnace unit, from the feed chute via the furnace grate up to the discharge of the bottom ash.

During feeding operation, a hopper on the feed chute is filled with material by means of a claw. This material is a substance which can be converted chemically with a positive energy balance and in the context of this application is preferably waste. This material can be wet and heavy and slide quickly into the hopper; it can adhere to the walls of the hopper, get stuck in the hopper or not reach the area of the furnace grate in a continuous manner via the hopper for other reasons.

The material ignites on the furnace grate and burns with a variable intensity and heat release depending on the composition of the waste. When a plurality of grates are operated next to one another, there is further the possibility that, as the waste is moved over different grate tracks, the waste also burns out in a variable manner.

In many cases, the function of furnace units, in particular of waste incineration installations, is to dispose of refuse in an environmentally friendly manner with emissions that are as low as possible and to generate energy. For this purpose, the heat release should be as constant as possible in order to achieve a controlled incineration on the one hand and provide a constant steam output that is unchanging as possible on the other.

SUMMARY OF THE INVENTION

The invention is thus based on the object of keeping the ultimately generated furnace output, which is generally reflected in the steam output, as constant as possible.

This object is achieved with a method for operating a furnace unit with a feed chute and a camera for capturing an image of the surface of the chute in that the chute comprises a slide on which material flows to a grate and the coverage of the chute and in particular of the slide with material and/or the change in position and thus the movement of individual components or surface areas within the chute is determined by an image evaluation.

The slide here is a surface of the feed chute which is inclined in relation to the vertical. The slide can be a bottom or a lateral surface of the feed chute, the material placed onto the chute sliding along these surfaces in order to reach the furnace unit.

If the wall material of the slide, which is generally an iron surface, is covered in a certain area and, depending on the movement of the ram feeder, is static or the coverage changes, it can be assumed that the material is sliding properly to the furnace unit. The movement of the combustible material on the slide in the direction of the furnace is coupled with the movement of the ram feeder. If the latter moves, then the material moves. If it does not move, then the material does not move. If this relationship is not provided and the material is moving although the feeder is not moving or it is not moving although the feeder is moving, then there is a defect which indicates that the material is not sliding properly to the furnace unit. A vertical wall area or an area on the slide can be observed here. A surface area of the chute is preferably observed which forms part of the slide and has an angle relative to the horizontal that is as small as possible, as the detected surface area in the event of a defective sliding is thus greater.

As a result, the coverage of a bottom side of the chute with material is preferably evaluated, while the other sides of the chute generally constitute additional reference points.

A preferred embodiment provides that, in the image, the position of at least one boundary point is determined, at which material covers the chute on one side and the surface of the chute is visible on the other side. It is advantageous when a plurality of boundary points are determined, in which case it is also possible to determine the position of a line connecting the boundary points in the image.

For the determination of the filling of the chute, it is also possible to calculate defined points on the side of the chute. In this case, the distance of at least of one boundary point from a defined point on the side of the chute is determined.

In other words, it is advantageous to determine the visible line between the chute and the material. In order to increase the precision of the image evaluation, the image of the surface of the chute can be divided into a plurality of zones. This makes it possible to determine the coverage in the individual zones with the image evaluation. The material flow at any point within the chute can be determined therefrom. A dynamic behaviour behavior of the furnace unit can be determined when a plurality of images are taken in a time interval and the filling level in the chute is determined by means of an image evaluation from the changes in the images. This thus also makes it possible to determine from the changes in the images the rate at which the material is flowing to the furnace unit. The rate then constitutes a possibility for also measuring the amount of material flowing to the grate.

Moreover, the change in position and thus the movement of individual components or surface areas within the chute can be tracked by means of imaging techniques. It is necessary to take a plurality of images in a time interval. These images can be taken as individual images or as film. Significant components or surface areas are selected within the chute after the introduction of the material and their movement detected (until the selected components are covered). The selection occurs in an automated manner and can be made based on structures and objects learned by means of artificial intelligence, based on significant shapes, colour c, colors or contours of material within the chute or based on random or defined areas within the chute. This method allows, like the method for detecting individual points at the transition between the chute and the material, the determination of the material flow within the chute. The method can be implemented individually or in addition to the detection of individual points at the transition between the chute and the material.

A defect detected in the area of the feed chute frequently leads directly to defects in the incineration on the grate. It is thus proposed as a further embodiment that an action is triggered in the event of a pre-defined coverage or a pre-defined change in the coverage of the chute and in particular of the slide with material or a certain material flow depending on the movement of the feeder. This action can be an early intervention in the regulation of the unit. For example, a clearing stroke can be initiated here or, in the event of an uncontrolled flow of waste, an adjustment can be realized through air management and/or the grate speed. An intervention in the speed and/or position of the feeder is also feasible in the event of an uncontrolled flow of waste for the optimization of the incineration. In addition, an auxiliary function (signal to the crane operator) or a direct intervention in the material supply of the chute by the crane as a function of the detected filling level of the chute is possible.

The use of an image evaluation makes it possible to determine, in the direction of flow of the material at the end of the image, the transition from material to background as a position of at least one point and preferably on the line. Alternatively or in addition to the coverage of the slide, it is thus possible to evaluate, in the case of a stationary arrangement of the camera, the height of a line on the determined image, which can be determined by the transition from the material to the chute. For this purpose, individual points or a continuous line, which can also be averaged, can be determined.

As a further embodiment, this makes it possible for the point or the line to be compared with a limit value and for an action to be triggered in the event that this limit value is exceeded. This action corresponds to the actions mentioned above.

It also turns out, however, that the use of an image evaluation is possible not only at the feed chute but at the end of the furnace grate for the control of the furnace unit.

Furnace units with a grate on the end of which a camera is arranged are known. The end of the grate constitutes the area where the bottom ash accumulates on the grate. A camera positioned here, which points from the bottom ash area toward the burning bed, shows how the material is burning in the burning bed. The brightness here shows the intensity of the burnout and the location of the brightness shows where the material is burning out on the grate particularly well.

According to the invention, it is further proposed to combine this camera with an image evaluation which determines a burning bed thickness and/or a burnout line and/or the movement of individual components or surface areas. With a stationary camera, the image shows the burning bed and static features inside the furnace chamber. The distance between a static feature and the burning bed is directly proportional to the height of the burning bed. A burning bed that is too high indicates an operation in which too much material is being fed in or a stoking movement that is too weak, which moves the material too slowly. A particularly low burning bed, which can be deduced from a low line in the image, indicates a material supply in which not enough material is being fed in and/or a stoking movement that is too intense, which moves the material too quickly.

In addition, it is further proposed to combine this camera with an image evaluation which determines the burnout line. With a stationary camera, the image shows the transition between burning and burned-out material as a burnout line. In practice, this contrast constitutes a line which lies either closer to the upper edge of the image taken by the camera or closer to the lower edge of this image. The height of the line is thus directly proportional to the position of the fire. A fire that is too long in the direction of the longitudinal extension of the grate indicates a material supply in which too much material is being fed in or that the material is poorly combustible. A particularly short fire, which can be deduced from the image, indicates a material supply in which not enough material is being fed in. Further, changes in the burnout line allow inferences regarding the stoking action of the grate and the primary air management, making it possible to adapt these parameters in order to improve incineration. The burnout line also makes it possible to render the amount of combustible material between different grate tracks even.

Additionally, the movement of individual components or fractions within the burning bed can be tracked by means of imaging techniques. Fractions here are surface areas which are detectable as such on account of their structure or which were selected as surface areas. It is necessary to take a plurality of images in a time interval. Significant components or fractions are selected within the burning bed after the introduction of the material and their movement detected until the selected components are covered. The selection occurs in an automated manner and can be made based on structures and objects learned by means of artificial intelligence, based on significant shapes, colour c, colors or contours of material within the chute or based on random or defined areas within the chute. This method allows the determination of the material flow inside the burning bed. The method can be implemented individually or in addition to the detection of the burning bed height and fire length.

In this manner, an image evaluation at the end of the grate allows an inference to be drawn regarding the feeding device.

Therefore, with a well-adjusted image evaluation and preferably also with a learning system such as, for example, a neural network, it is possible to detect a burning bed that is too thin or too thick and a fire that is too long or too short, i.e. an incorrect position of the burnout line.

This information can be compared with a target value so that an action can be triggered as a function of the fire location and/or the burning bed thickness and/or the movement of individual components or surface areas. This action can in turn, as indicated above, be an intervention in the conveyance on the grate or in the gas ratios. It is thus proposed as a further embodiment that, as a function of the location of the fire on the grate, in particular in the longitudinal direction of the grate, and/or of the burning bed thickness, an intervention in a control or a regulation of the furnace unit occurs automatically. It is thus proposed that the grate speed is controlled or regulated as a function of the fire location and/or burning bed thickness. It is particularly advantageous in this context when the grate speed of individual grate zones or adjacent grate tracks is controlled or regulated.

Additionally or alternatively, the air flow of the furnace unit can also be controlled or regulated as a function of the burning bed thickness and/or the fire location. In particular the primary air of the furnace unit is controlled or regulated as a function of the fire location and/or the burning bed thickness in this context.

It is particularly advantageous when the furnace comprises individual grate tracks which are analysed analyzed by means of an image evaluation so that the feeding of the individual grate tracks can be controlled or regulated as a function of the burning bed thickness and/or the fire location. To this end, for example the stroke length can be adjusted or a zero-offset setting of the feeder is selected.

It is particularly advantageous when the individual grate tracks have a plurality of drives so that the intensity of the stoking movement of the individual grate zones can be controlled or regulated as a function of the burning bed thickness and/or the fire location. To this end, for example the stoking speed can be adjusted.

A coupling of both optical camera systems is advantageous. This way, interventions triggered by the camera above the chute can be checked by means of the camera at the end of the burning bed. By means of the implementation of control loops or neural networks, it is possible to optimize the triggered interventions.

Even independently of the method steps mentioned in the foregoing, a method for operating a furnace unit with at least one grate, which comprises a plurality of grate zones and/or a plurality of grate tracks, and a plurality of combustible-material feeders is proposed, in which method, in order to establish an even heat release on the grate, the temperature per grate zone and/or per grate track is measured and the combustible-material feeders are controlled as a function of the measured temperature.

It is particularly advantageous in this context when at least one temperature measurement device is used per grate zone and/or per grate track. The temperature measurement can occur parallel to the grate segments or in the first waste stream duct. In order to avoid that the precision of the temperature measurement is compromised by turbulent air, it is proposed that a registration of the temperature change occur close to the furnace and at the latest at a level of the waste stream duct reached by the flue gases after 1 to 15 seconds.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 6 shows a furnace unit with two waste stream ducts; and

FIG. 7 illustrates the furnace unit shown in FIG. 6 in a perspective view.

DETAILED DESCRIPTION OF PREFERRED EMBODIMENTS

Figure 1:
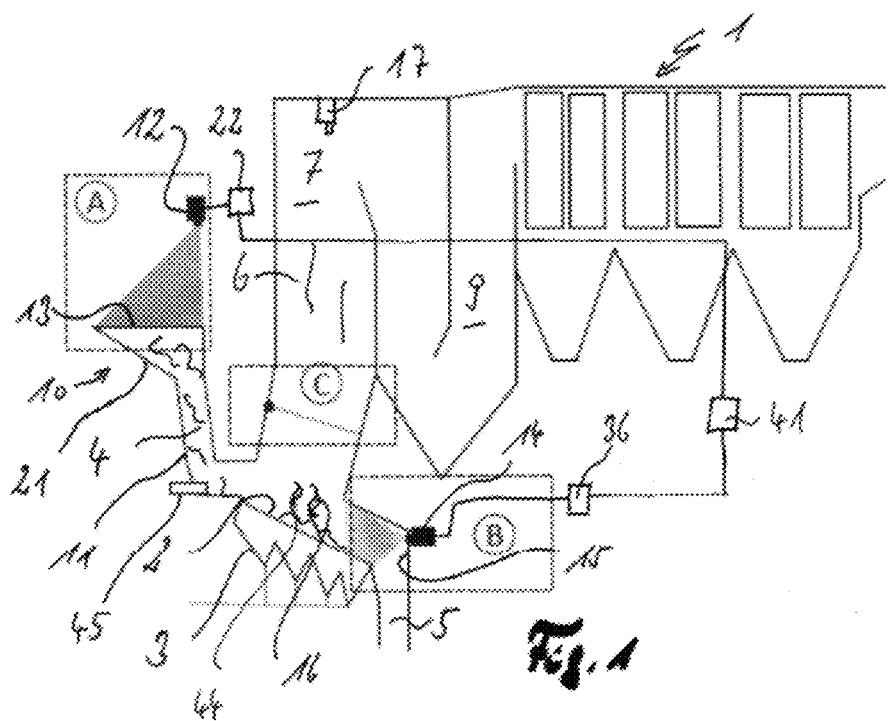
FIG. 1 shows schematically a grate furnace with an analysis of the chute A, an analysis of the fire B and an analysis of the temperatures on the grate track C.

The furnace unit 1 shown in FIG. 1 is a grate furnace with a grate 2, under which a primary air supply 3 is arranged. The material 4 burned on the grate 2 is conveyed over the grate 3 to a bottom ash discharge 5. The flue gas 6 generated during the incineration of the material 4 on the grate 2 reaches a first duct 7 and, from there, flows into further ducts 8 and 9 in order to heat water, which is used as steam for an energy generation unit (not shown).

During the operation of the furnace unit 1, waste travels as material 4 from the chute 10 through a feed channel 11 to the grate 2 and from there to the bottom ash discharge 5. In the process, a camera 12 is used to capture the surface 13 of the chute and depict it as an image 14.

A further camera 34 at the end 15 of the grate 2 is pointed at the material 4 on the grate 2 and the flame 16 generated by the combustion of the material 4. Therebetween, the flame 16 generated on the grate 2 can be observed from above by a third camera 17.

Figure 2:
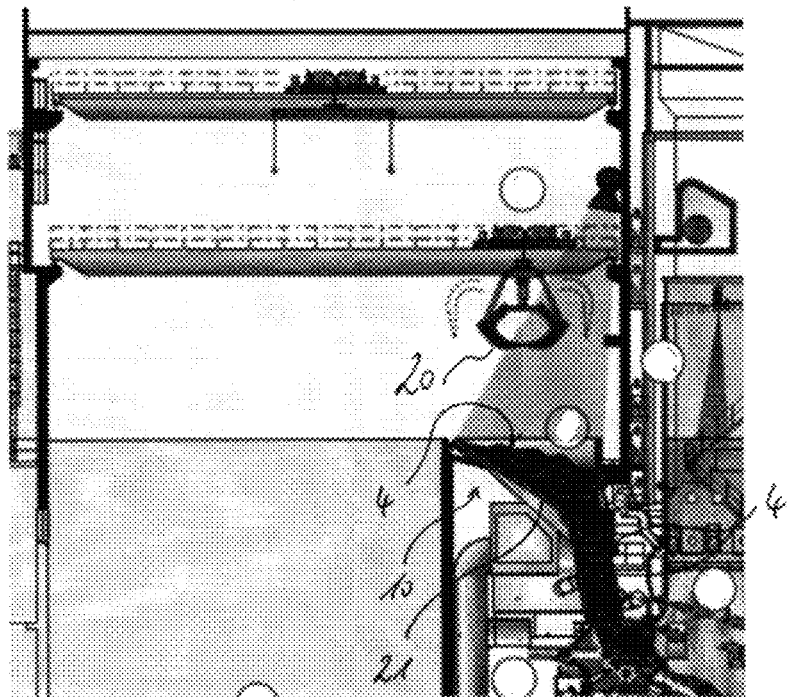
FIG. 2 shows a section through the area of a feed chute of a furnace unit.

FIG. 2 shows how, by means of a claw 20, material 4 can be tossed into the feed chute 10 before then travelling on a slide 21 into the channel 4 and from there to the furnace grate 2.

The camera 12 is connected to an image evaluation 22, which determines the coverage of the chute 10 and in particular of the slide 21 with material 4.

Figure 3:
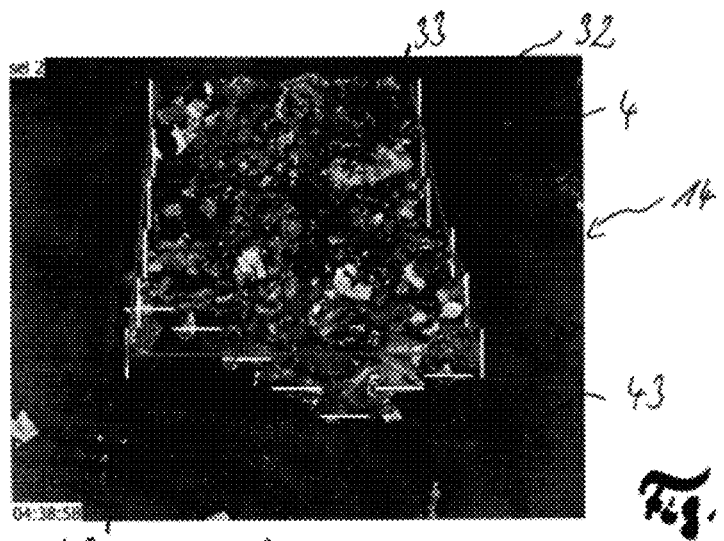
FIG. 3 is a top view of the chute shown in FIG. 2.
Figure 4:
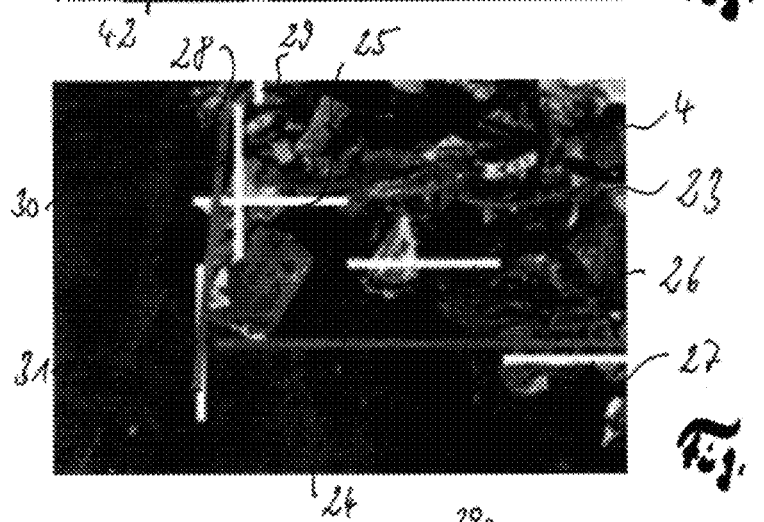
FIG. 4 is an enlarged view from FIG. 3.

FIG. 3 and in particular its enlargement as shown in FIG. 4 show areas 23 in which the slide 21 is covered with material 4 and an area 24 as well as an area 43 in which the upper side of the slide 21 is visible, as it is not covered with material 4 in this area 24.

Bars 25, 26 and 27 constitute boundary points in the image 4, at which material 4 covers the chute 10 on one side and the surface of the chute 10 is visible on the other side.

Defined points 29, 30 and 31 are indicated as vertical bars on the side 28 of the chute 10. This makes it possible to determine the intersection between horizontal bars 25, 26 and 27 and vertical bars 29, 30 and 31 in order to infer the filling of the chute 10 therefrom.

In the image 14 of FIG. 3, the line 33 shows the transition between the material 4 and the background 33. The height of this line 33 in the image 4 and deviations from a straight line provide information regarding the material in the chute 10.

Figure 5:
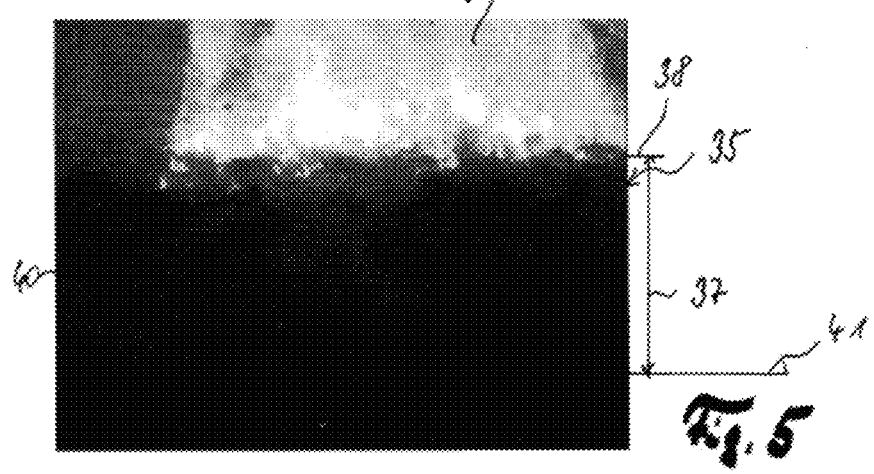
FIG. 5 shows an image by a camera arranged at B in FIG. 1.

FIG. 5 shows an image 35 taken with a camera 14 at the end of the grate 2 in the direction of flow of the material 4. From this image 35, the image evaluation 36 determines the burning bed thickness 37 as the distance between a line 38 and a line 41. The line 38 results from the contrast between the bright area 39 of the flames 16 and the dark area 40 of the bottom ash. The height of the line 41 in the image 35 can be determined by testing and also occurs in units that do not yet have any material 4 on the grate 2.

The image evaluation devices 22 and 36 are connected to the control system 41 of the furnace unit 1 so that, if a limit value is exceeded, it is possible to intervene in the regulation 41 of the furnace unit in order to control or regulate the grate speed and/or the air supply of the furnace unit 1 as a function of the limit value detected at the chute 10 and/or the burning bed thickness 37.

FIG. 6 shows a furnace grate 2 and, above it, the first flue gas duct 7, which is followed by the second flue gas duct 8. Measuring parallel to the grate 2 or horizontally, a temperature measurement device 49 is arranged. A temperature measurement level 52 is thereby created above the secondary air level 54. FIG. 7 shows an illustrative arrangement of the temperature measurement devices for a unit with 3 grate tracks 46, 47 and 48. Each grate track is associated with a temperature measurement device 49, 50 and 51.

Although only a few embodiments of the present invention have been shown and described, it is to be understood that many changes and modifications may be made thereunto without departing from the spirit and scope of the invention.

What is claimed is:

1. A method for operating a furnace unit, the method comprising:
providing the furnace unit with a feed chute comprising a slide;
causing material to flow on the slide to a grate;

capturing an image of a surface of the chute with a camera; and evaluating the image to determine coverage of the slide with material and/or a change in position and thus movement of individual components or surface areas within the chute.

2. The method according to claim 1, further comprising determining in the image the position of at least one boundary point at which the material covers the chute on one side and the surface of the chute is visible on the other side.

3. The method according to claim 2, wherein the position of the at least one boundary point is determined in the area of the slide.

4. The method according to claim 2, wherein the positions of a plurality of boundary points are determined.

5. The method according to claim 4, further comprising determining the position of a line connecting the boundary points in the image.

6. The method according to claim 2, further comprising determining the distance of the at least one boundary point from a defined point is determined on a side of the chute.

7. The method according to claim 2, further comprising determining a visible line between the chute and the material.

8. The method according to claim 1, further comprising dividing the image of the surface of the chute into a plurality of individual zones and evaluating the image to determine the coverage in the individual zones.

9. The method according to claim 1, further comprising taking a plurality of images or a video in a time interval and evaluating changes in the images to determine the filling level in the chute.

10. The method according to claim 9, further comprising determining the rate at which the material flows to the grate from the changes in the images.

11. The method according to claim 1, further comprising triggering an action in the event of a pre-defined coverage or a pre-defined change in the coverage of the chute or a certain material flow depending on the movement of a feeder.

12. The method according to claim 9, further comprising determining a transition from material to background as a position of at least one point or of a line in a direction of flow of the material at an end of the image.

13. The method according to claim 12, further comprising comparing the point or the line with a limit value and triggering an action in the event that the limit value is exceeded.

14. The method according to claim 1, further comprising determining the waste quality and/or waste composition from the image of the surface of the chute by a learning system.

15. The method according to claim 1, wherein the camera is arranged on an end of the grate, the method further comprising evaluating the image to determine burning bed thickness and/or a burnout line and/or the movement of individual components or surface areas.

16. The method according to claim 15, further comprising evaluating the image to detect an overfilled burning bed using a learning system or based on a characteristic shape of the burnout line.

17. The method according to claim 15, further comprising triggering an action as a function of the burning bed thickness and/or the burnout line and/or the movement of individual components or surface areas.

18. The method according to claim 15, further comprising causing an automatic intervention in a control or a regulation of the furnace unit as a function of the burning bed thickness and/or the burnout line and/or the movement of individual components or surface areas.

19. The method according to claim 15, further comprising controlling or regulating the grate speed as a function of the burning bed thickness and/or the burnout line and/or the movement of individual components or surface areas.

20. The method according to claim 15, further comprising controlling or regulating the air supply of the furnace unit as a function of the burning bed thickness and/or the burnout line and/or the movement of individual components or surface areas.

21. The method according to claim 20, further comprising controlling or regulating primary air of the furnace unit as a function of the burning bed thickness and/or the burnout line and/or the movement of individual components or surface areas.

22. The method according to claim 15, further comprising controlling or regulating the feeding of individual grate tracks of the furnace unit as a function of the burning bed thickness and/or the burnout line and/or the movement of individual components or surface areas.

23. The method according to claim 1, wherein the grate comprises a plurality of grate zones and/or a plurality of grate tracks, and the furnace unit comprises a plurality of combustible-material feeders, and wherein the method further comprises establishing an even heat release on the grate by measuring the temperature per grate zone and/or per grate track and controlling the combustible-material feeders as a function of the measured temperature.

24. The method according to claim 23, wherein at least one temperature measurement device is used per grate zone and/or per grate track.

25. The method according to claim 1, wherein the temperature measurement occurs parallel to the grate.

26. The method according to claim 1, wherein the temperature measurement occurs in the first waste stream duct.

* * * * *